H. HAVELL.
Meat Cutter.

No. 24,210.

2 Sheets—Sheet 2.

Patented May 31, 1859.

Witnesses:
John G. Budd
William H. Foster

Inventor:
Henry Havell

UNITED STATES PATENT OFFICE.

HENRY HAVELL, OF NEWARK, NEW JERSEY.

IMPROVED MEAT-CUTTER.

Specification forming part of Letters Patent No. 24,210, dated May 31, 1859.

*To all whom it may concern:*

Be it known that I, HENRY HAVELL, of Newark, Essex county, New Jersey, have invented a new and useful Improvement in Meat-Cutters; and I do hereby declare the following to be a full, clear, and exact description thereof, reference being had to the accompanying drawings, making part of this specification.

The said invention consists, first, in a peculiar construction of rotary knives adapted to facilitate the feeding of the machine, and, second, in an arrangement to sustain the ends of the stationary knives and increase the efficiency of their operation.

Figure 1:
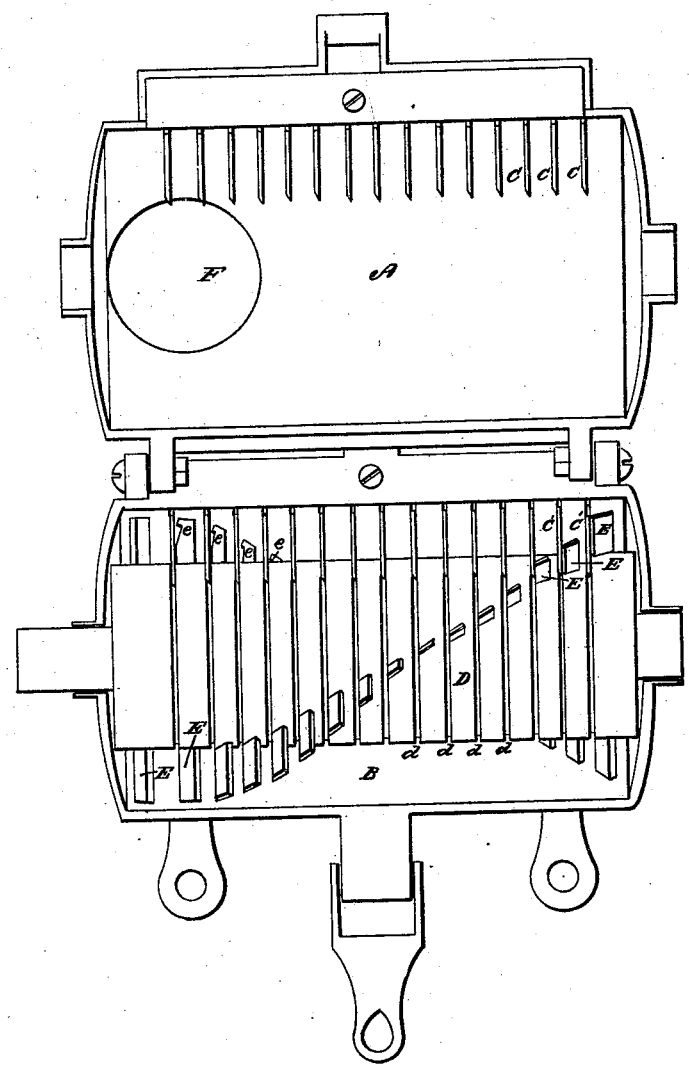
Figure 2:
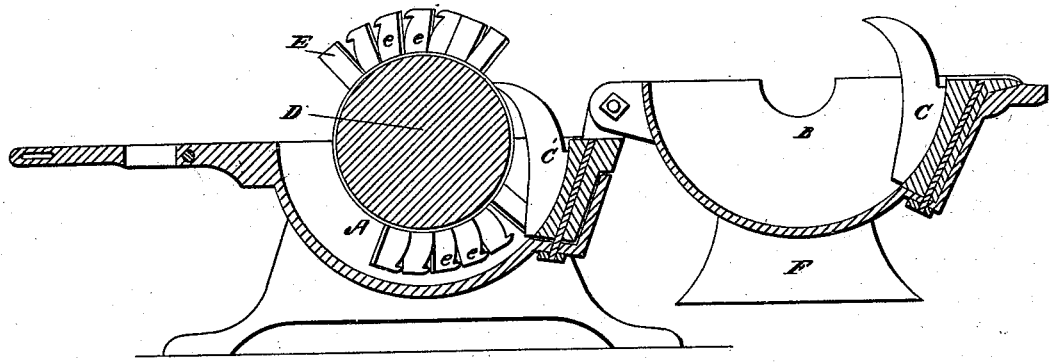
Figure 3:
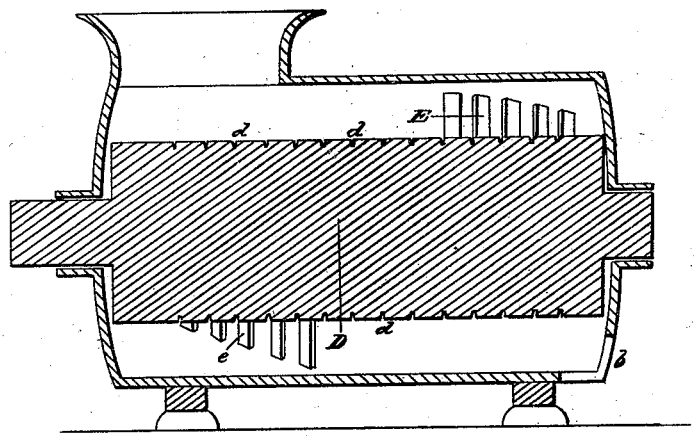

In the accompanying drawings, Figure 1 is a top view of the machine with the upper part thrown back, so as to expose the interior. Fig. 2 is a vertical transverse section of the same. Fig. 3 is a vertical longitudinal section of the apparatus closed and ready for action.

A and B represent, respectively, the upper and lower half of a cylindrical case connected at one side by hinges and at the other provided with a suitable hasp to keep the machine closed while in use.

C C' are knives of curved form attached, respectively, to the upper and lower parts of the case in the manner shown, so as when the machine is in use to form a continuous range from end to end on each side.

D is a cylinder journaled concentrically within the case A B and armed with spiral ranges of bevel-edged knives E, adapted and arranged to cut shearwise with the stationary knives C C'. A portion of the knives E, at the part where meat is introduced to the machine, are constructed with hooked points, as seen at $e$ $e$.

$d$ $d$ $d$ are latitudinal grooves in the periphery of the cylinder D, which receive the ends of the stationary knives C C' and sustain them firmly against lateral deflection.

F is a hopper through which meat is introduced near one end of the machine.

$b$ is an aperture in the case B near the other end, through which cut meat is ejected.

The operation is as follows: The cylinder D being rotated in the direction indicated by the arrow, any meat placed in the hopper F is rapidly drawn within the machine by means of the hooked points $e$ of the rotary knives E, and is cut into fine pieces by the shearing action of the said rotary knives in combination with the stationary knives C C', the spiral arrangement of the rotary knives operating at the same time to forward the meat through the machine while in process of being cut, and finally eject it through the aperture $b$.

The grooves $d$, adapted to sustain the points of the stationary knives C C', are of especial importance in the combination here shown to maintain the shearing action of the knives C, C', and E, and preserve the former from injury by contact with bones, &c.

What I claim as my invention, and desire to secure by Letters Patent, is—

1. The hook-pointed rotary knives E $e$, arranged in the described relation to the hopper F, for the purpose explained.

2. The combined arrangement of the stationary curved knives C C', latitudinal grooves $d$, and rotary knives E, substantially as and for the purposes set forth.

In testimony of which invention I hereunto set my hand.

HENRY HAVELL.

Witnesses:
 JOHN C. BUDD,
 W. BRADSHAW.